United States Patent
Desjardins

(10) Patent No.: US 8,995,509 B2
(45) Date of Patent: *Mar. 31, 2015

(54) SYSTEMS AND METHODS FOR FLOW CONTROL OF A REMOTE TRANSMITTER

(71) Applicant: Broadcom Corporation, Irvine, CA (US)

(72) Inventor: Philip Desjardins, Nevada City, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,245

(22) Filed: Nov. 25, 2013

(65) Prior Publication Data

US 2014/0086058 A1    Mar. 27, 2014

Related U.S. Application Data

(63) Continuation of application No. 13/072,379, filed on Mar. 25, 2011, now Pat. No. 8,594,164.

(51) Int. Cl.

| | |
|---|---|
| *H04B 1/38* | (2006.01) |
| *H04L 5/16* | (2006.01) |
| *H04L 12/835* | (2013.01) |
| *H04L 7/00* | (2006.01) |
| *H04L 7/10* | (2006.01) |
| *H04L 12/28* | (2006.01) |
| *H04M 11/06* | (2006.01) |

(Continued)

(52) U.S. Cl.
CPC ............... *H04L 47/30* (2013.01); *H04L 7/005* (2013.01); *H04L 7/10* (2013.01); *H04L 12/2881* (2013.01); *H04M 11/062* (2013.01); *H04L 49/901* (2013.01); *H04L 47/18* (2013.01); *Y02B 60/36* (2013.01)
USPC ................. 375/222; 710/52; 710/57

(58) Field of Classification Search
USPC ......................... 375/222; 710/52–57
See application file for complete search history.

(56) References Cited

U.S. PATENT DOCUMENTS 6,643,719 B1    11/2003  Baker
(Continued)

OTHER PUBLICATIONS

"Series G: Transmission Systems and Media, Digital Systems and Networks," Document No. G.992.3, downloaded from http://www.itu.int/rec/T-REC-G.992.3-200904-I/en, *International Telecommunication Union*, Apr. 2009, pp. 1-404.

(Continued)

*Primary Examiner* — Curtis Odom
(74) *Attorney, Agent, or Firm* — Sterne, Kessler, Goldstein & Fox PLLC

(57) ABSTRACT

Systems and methods are provided to enable a near-end receiver to control the far-end transmitter's data transmission such that the near-end receiver's TC data buffers do not overflow. In an embodiment, a high waterline and low waterline implemented into a near-end receiver are used to determine when the near-end receiver's TC data buffers are near maximum capacity. In an embodiment, the near-end receiver transmits a Packet Transfer Mode (PTM) All Idle Out Of Sync (AIOOS) codeword to the far-end transmitter when the high waterline is reached, and the near-end receiver stops transmitting the AIOOS codeword when the low waterline is reached.

20 Claims, 9 Drawing Sheets

(51) Int. Cl.
*H04L 12/879* (2013.01)
*H04L 12/801* (2013.01)

(56) References Cited

U.S. PATENT DOCUMENTS

| | | | |
|---|---|---|---|
| 6,882,622 | B1 | 4/2005 | Donoghue |
| 8,594,164 | B2 * | 11/2013 | Desjardins .................... 375/222 |
| 2009/0219942 | A1 | 9/2009 | Peeters et al. |
| 2010/0168885 | A1 * | 7/2010 | Li et al. ........................ 700/94 |

OTHER PUBLICATIONS

"Series G: Transmission Systems and Media, Digital Systems and Networks," Document No. G.992.3 Annex C, downloaded from http://www.itu.int/rec/T-REC-G.992.3-200904-I/en, *International Telecommunication Union*, Apr. 2009, pp. 1-296.

"Part 3: Carrier Sense Multiple Access With Collision Detection (CSMA/CD) Access Method and Physical Layer Specifications," *IEEE Std 802.3ah™-2004*, 2004, pp. 1-640.

* cited by examiner

| Type | Sync Byte | Data | Byte Fields 1-64 | | | | | | | | | |
|---|---|---|---|---|---|---|---|---|---|---|---|---|
| All data | 0F₁₆ | DDDD – DDDD | D₀ | D₁ | D₂ | D₃ | D₄ | D₅ | ... | D₆₁ | D₆₂ | D₆₃ |
| End of frame | F0₁₆ | Contains k D's (0≤k≤63) and (63-k) Z's | Cₖ | D₀ | D₁ | D₂ | D₃ | ... | Dₖ₋₁ | | | |
| Start of frame while transmitting | F0₁₆ | Contains last k D's of 1st frame (0≤k≤62), (62-k-j) Z's and (first j) D's of second frame (0≤j≤62-k) | Cₖ | D₀ | ... | Dₖ₋₁ | Z | Z | S | D₀ | ... | Dⱼ₋₁ |
| All idle | F0₁₆ | ZZZZ-ZZZZ | Z | Z | Z | Z | Z | Z | ... | Z | Z | Z |
| Start of frame while idle | F0₁₆ | Contains (63-k) Z's and k D's (0≤k≤63) | Z | S | Z | D₀ | D₁ | D₂ | ... | Dₖ₋₃ | Dₖ₋₂ | Dₖ₋₁ |
| All idle out of sync | F0₁₆ | YZZZ-ZZZZ | Y | Z | Z | Z | Z | Z | ... | Z | Z | Z |

Where S=50₁₆, Y=D1₁₆, Z=00₁₆, Cₖ=k+16 plus optional 80₁₆ to make parity even

PTM-TC Basic Codeword Formats

FIG. 3
PRIOR ART

SYSTEMS AND METHODS FOR FLOW CONTROL OF A REMOTE TRANSMITTER

CROSS-REFERENCE TO RELATED APPLICATIONS

This application is a continuation of U.S. patent application Ser. No. 13/072,379, filed Mar. 25, 2011, assigned U.S. Pat. No. 8,594,164, which is herein incorporated by reference in its entirety.

FIELD OF THE INVENTION

This invention relates to digital communications and more specifically to communications over Digital Subscriber Line (DSL) equipment.

BACKGROUND OF THE INVENTION

Digital Subscriber Line (DSL) is a family of technologies used to provide digital data transmission over a local telephone network. By sending signals over the telephone line at high frequencies, DSL can transform an ordinary telephone line (e.g., twisted-pair) into a broadband communications link.

Over the years, DSL technology has evolved into a family of specific implementations and standards. These various implementations offer a variety of transmission speeds and transmission distances and include, for example, High Speed DSL (HDSL), Symmetrical or Single Pair DSL (SDSL), Symmetric High Speed DSL (SHDSL), Asymmetric DSL (ADSL), Very High Speed DSL (VDSL), and Rate Adaptive DSL (RADSL). The various DSL implementations that have evolved over the years may be collectively referred to as xDSL.

In contrast to some other communications protocols, DSL does not have the capability, at the physical layer (PHY) or the Transmission Convergence (TC) Layer, to signal a far-end transmitter to restrict or temporarily halt transmission of data when a near-end receiver becomes temporarily congested with information that it cannot forward to the intended destination. This situation often arises when the destination is busy with other tasks or is processing previously received data and therefore is not ready to receive information from the near-end receiver's TC layer. Because the far-end transmitter is often continually sending data to the near-end receiver, the receiver's TC data buffers can overflow, forcing the receiver to drop the information until the intended destination is able to accept the data from the TC layer.

The dropped information is lost, and this loss is usually detected at a higher layer, such as a web browser application, which forces a retransmission of the original data. Because detection of lost information is done at a higher layer, and because there is significant latency involved in getting information to the higher layer, this retransmission can cause a significant reduction in data transfer at the application layer.

What is needed are systems and methods for a near-end receiver to control the far-end transmitter's data transmission such that the near-end receiver's TC data buffers do not overflow.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, serve to explain the principles of the present invention. In the drawings:

FIG. 3 shows a table 300 of the codeword types in the PTM-TC layer of DSL.

Figure 5:
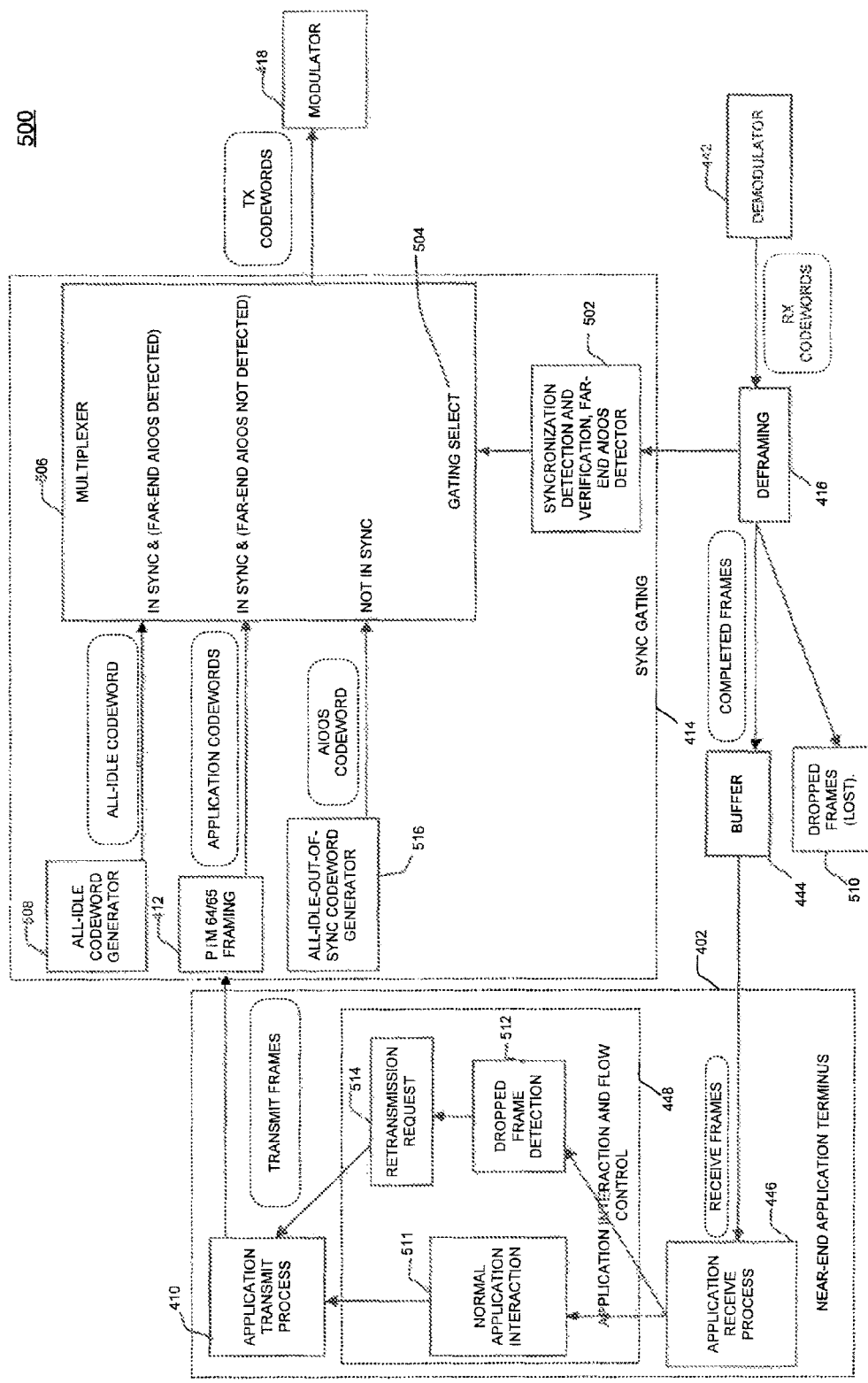

FIG. 5 depicts a more detailed diagram 500 of the flow of data between the near-end application terminus 402 and near-end DSL modem 404.

Figure 6:
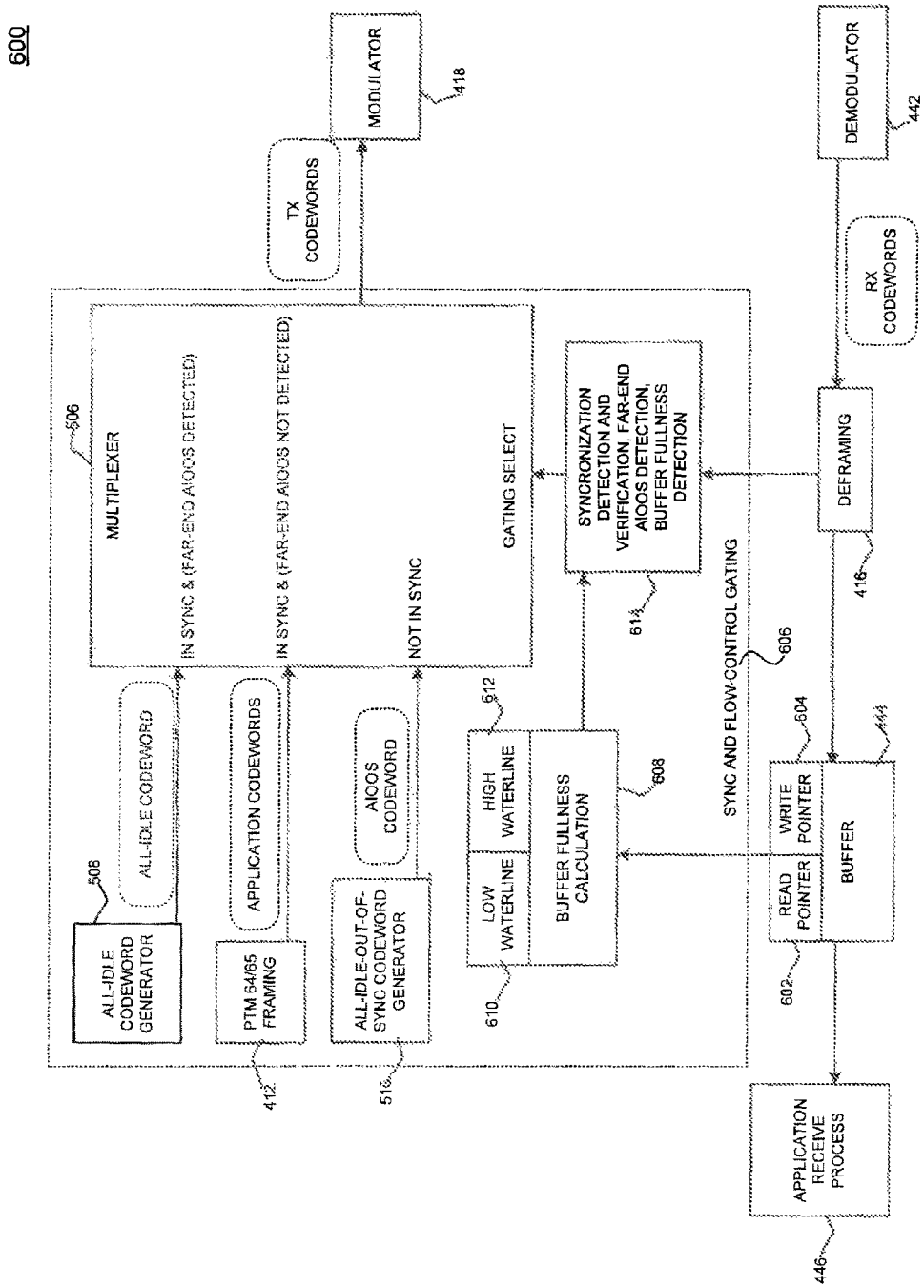

FIG. 6 is a diagram 600 depicting an embodiment of the present invention incorporating a high waterline and low waterline.

Figure 7:
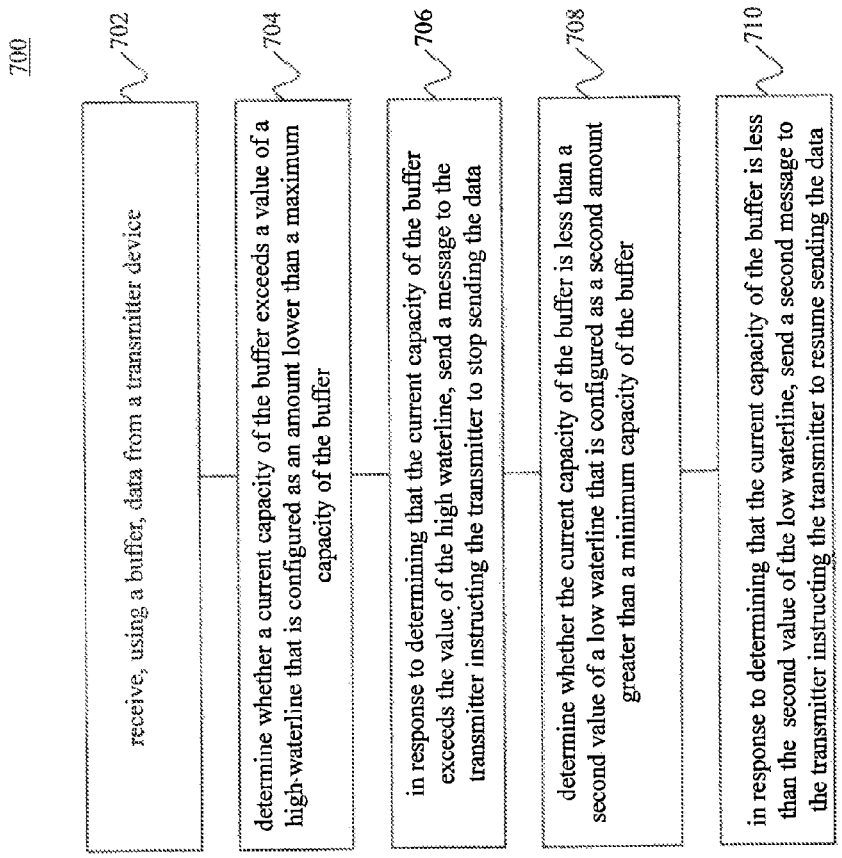

FIG. 7 is a diagram illustrating a method 700 according to an embodiment of the present invention.

Figure 8:
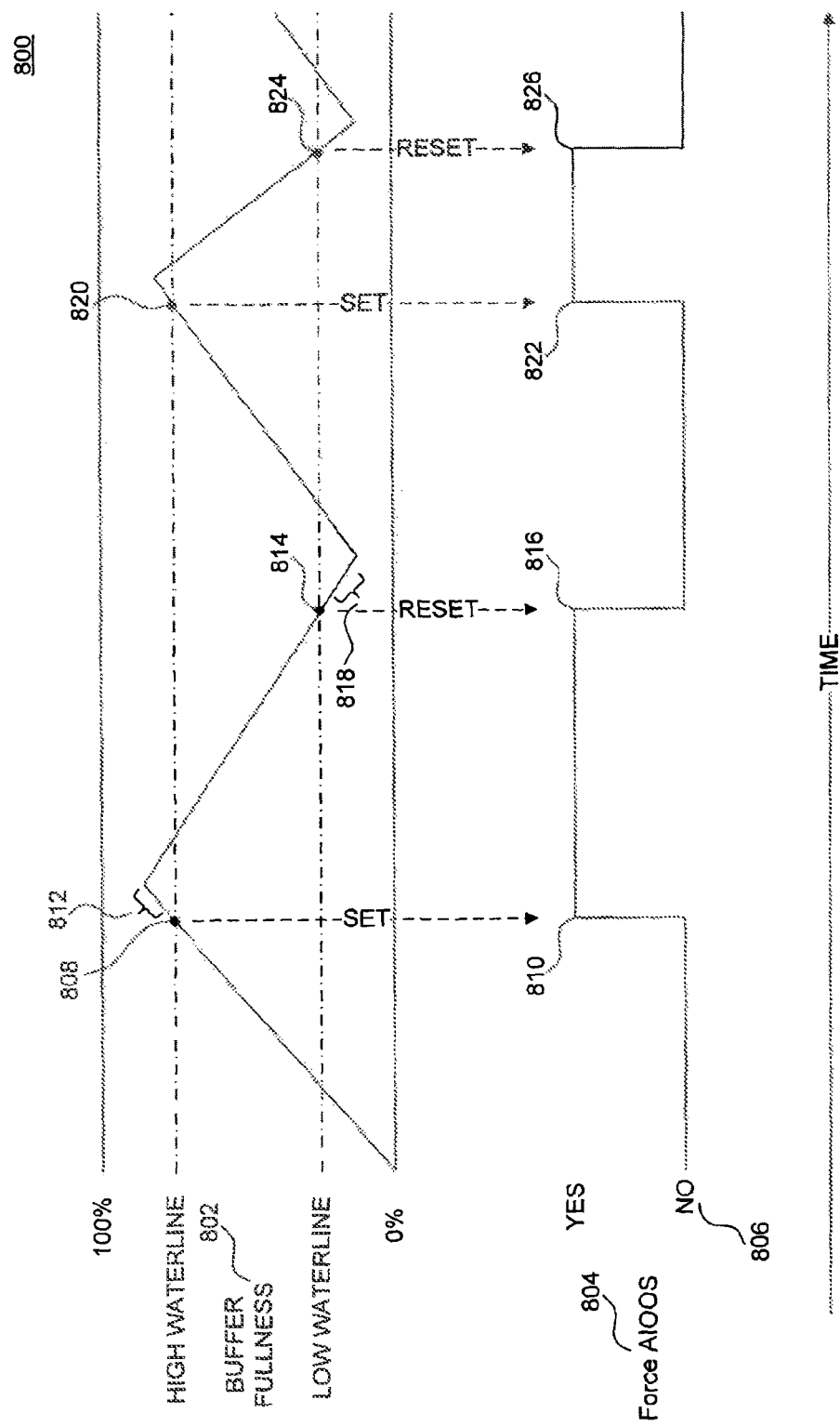

FIG. 8 is a diagram 800 showing a timeline of the fullness of a buffer, as AIOOS is set and reset, in accordance with an embodiment of the present invention.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Systems and methods are provided herein for enabling a near-end receiver, in a DSL system, to control the data transmission by a far-end transmitter such that the near-end receiver's TC data buffers do not overflow, which improves overall communications rates. Advantageously, attributes of existing deployed DSL equipment are exploited in accordance with disclosed embodiments, and thus no modifications to equipment already deployed in the field are required for flow control to be achieved.

1. OVERVIEW OF DSL SYSTEM

Figure 1:
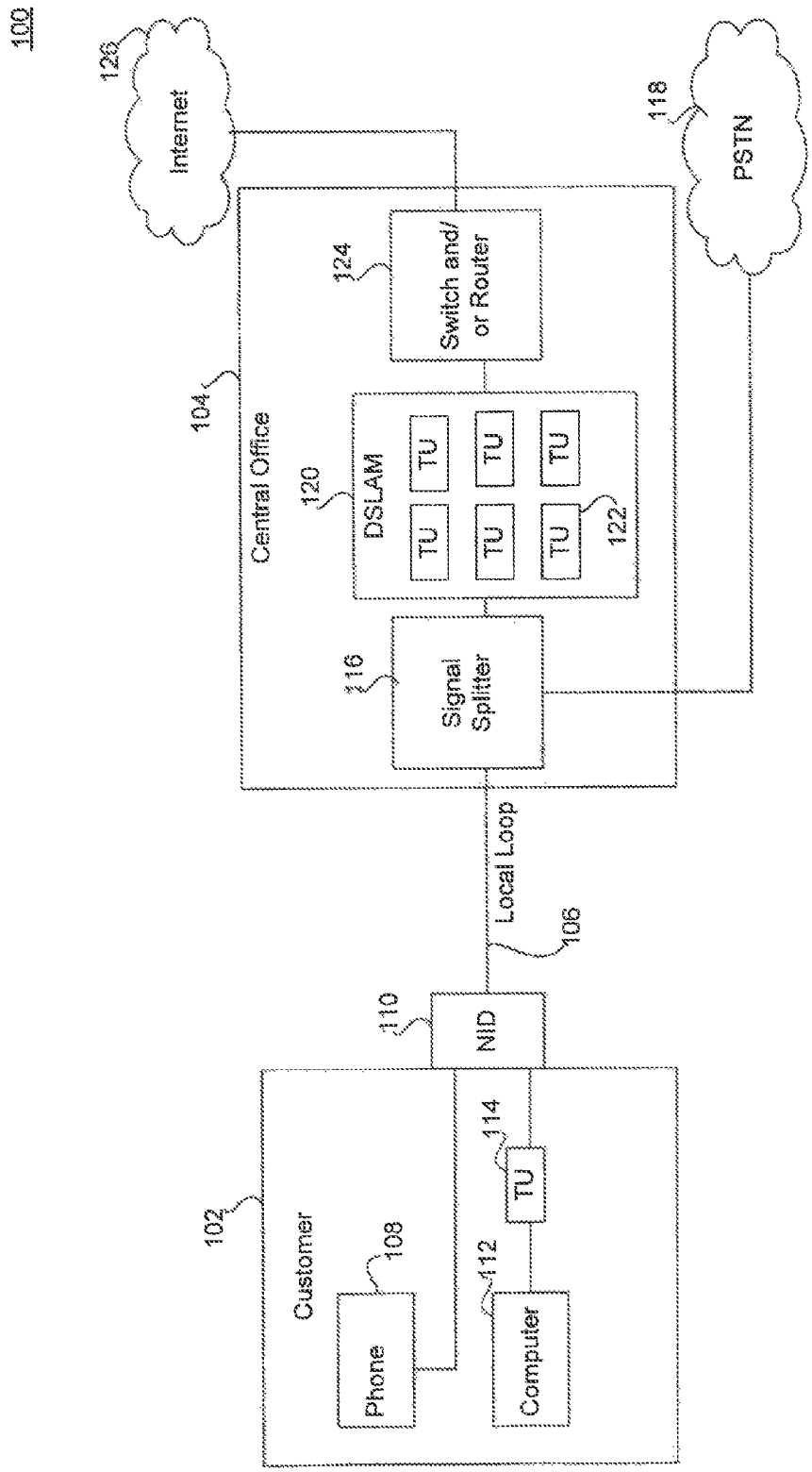
FIG. 1 illustrates an exemplary DSL loop system.

An exemplary DSL loop system 100 will now be explained with reference to FIG. 1. Customer 102 receives DSL services from central office 104 via local loop 106. Network interface device (NID) 110 is used to interface devices to local loop 106. For example, telephone 108 connects to NID 110 to receive services from central office 104. Computer 112 connects to NID 110 through a modem or termination unit (TU) 114. A signal splitter (not shown) within NID 110 passes low frequency telephone signals to telephone 108 and high frequency data signals to TU 114. The signal splitter includes filters designed to diplex signals onto local loop 106, which have stopband impedance characteristics that minimize the effect of changing telephone 108 from an "on hook" to an "off hook" condition. This allows customer 102 to use local loop 106 as a communications link for both telephone service and broadband data service at the same time.

Central office 104 includes plain old telephone system (POTS) signal splitter 116, DSL access multiplexer (DSLAM) 120, and switch/router 124. Signal splitter 116 passes low frequency telephone signals received from telephone 108, via local loop 106, to public switched telephone network (PSTN) 118. High frequency data signals received via local loop 106 are passed to DSLAM 120. DSLAM 120 includes a plurality of central office modems or termination units 122 arranged in a bank configuration. DSLAM 120 collects data from central office modems 122 and multiplexes the data together. From DSLAM 120, the data decoded from the high frequency data signals are sent to switch/router 124 and transmitted over internet 126.

Figure 2A:
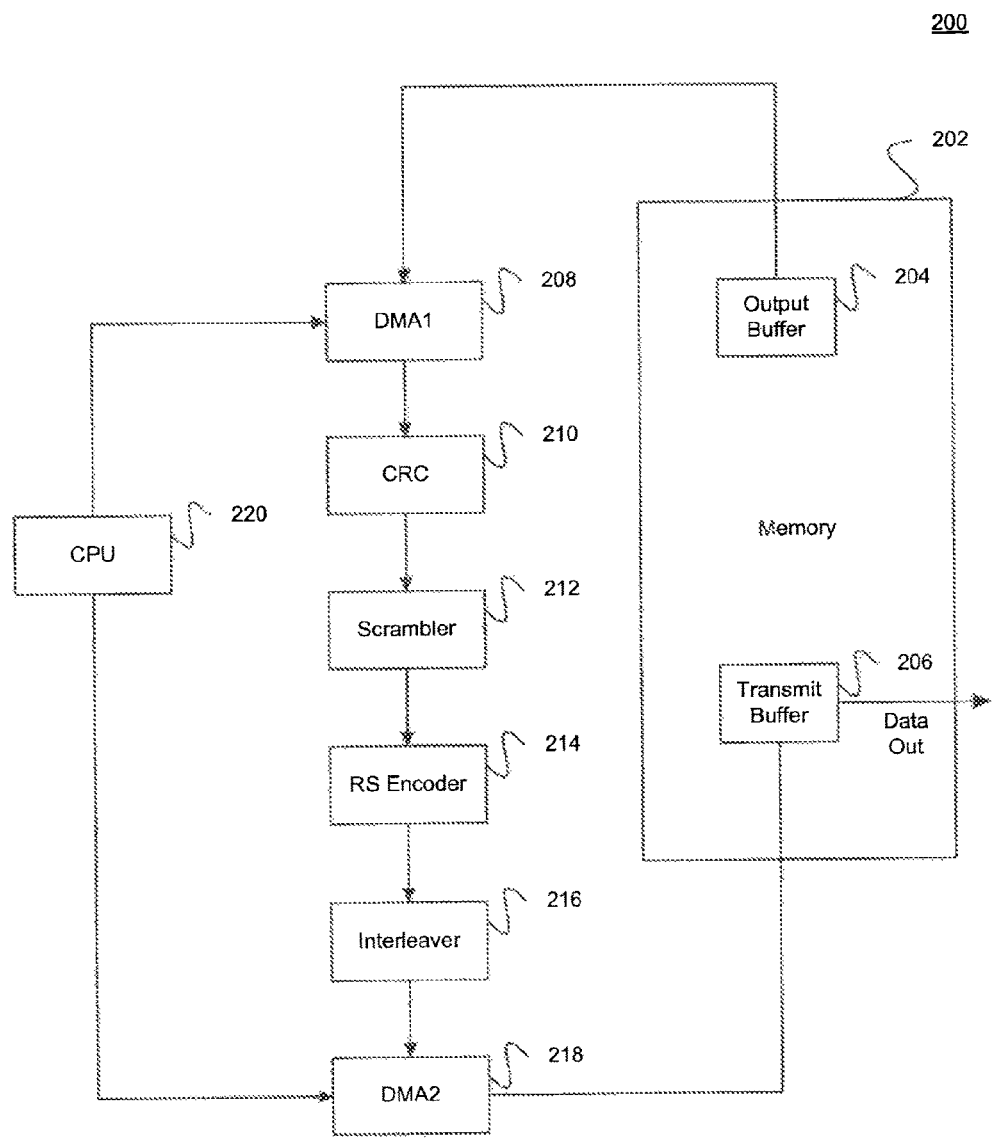
FIG. 2A shows a portion of a transmitter 200 according to an embodiment of the present invention.
Figure 2B:
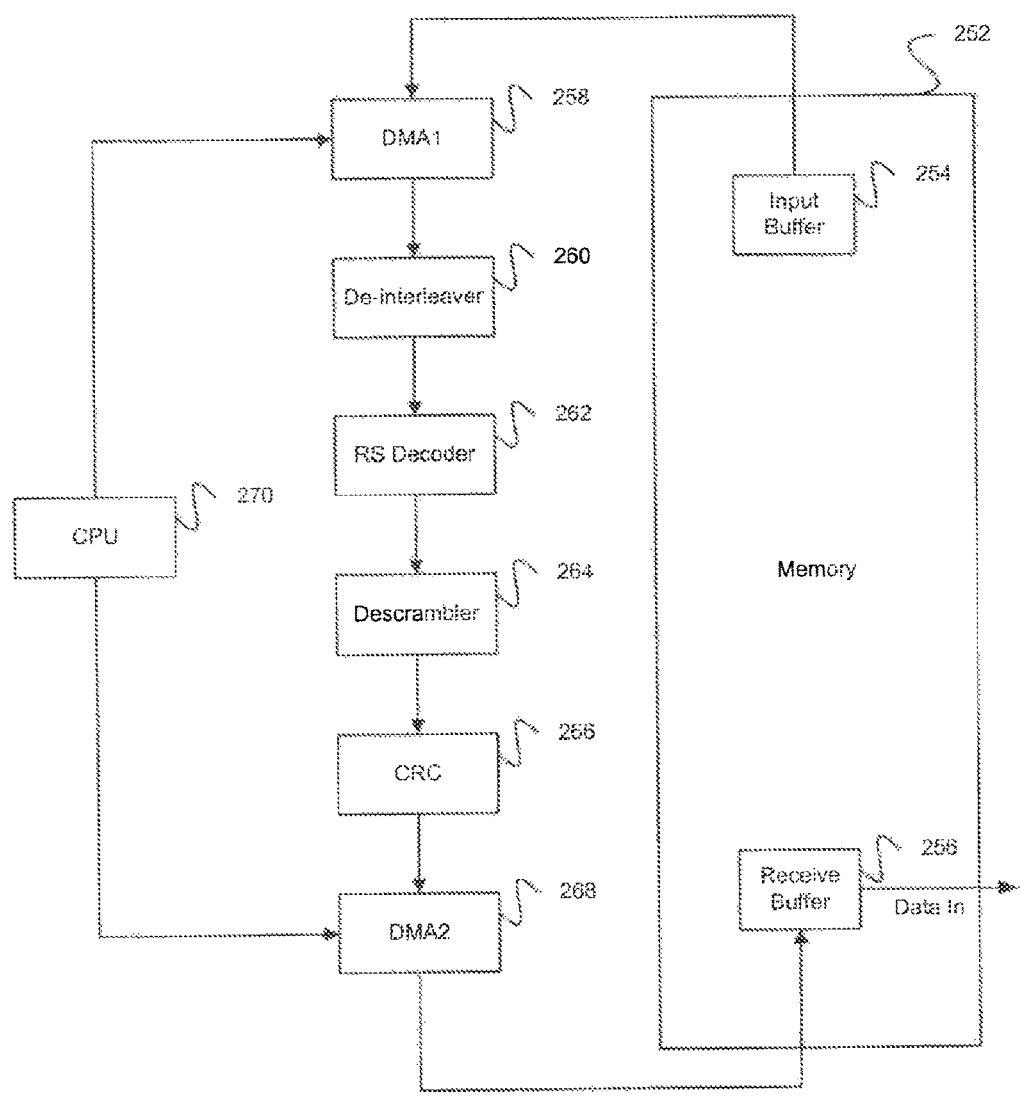
FIG. 2B shows a block diagram of a portion of a receiver 250 according to an embodiment of the present invention.

An operation of DSL transmitters and receivers in accordance with an embodiment of the present invention will now be explained with references to FIGS. 2A and 2B. FIGS. 2A and 2B show exemplary implementations of the physical layers of transmitter 200 and receiver 250, respectively. A physical layer performs bit-level operations on codewords. As would be appreciated by those skilled in the art, the portions of the physical layers of transmitter 200 and receiver 250 shown in FIGS. 2A and 2B may also include other elements.

1.1 DSL Transmitter

FIG. 2A shows a portion of a transmitter 200 according to an embodiment of the present invention. For example, transmitter 200 may be included in TU 114 and/or TU 122, as described with reference to FIG. 1 above. Transmitter 200 transmits high frequency data over local loop 106, and the high frequency data can be intermixed with low frequency voice data. In an embodiment, the portion of transmitter 200 shown in FIG. 2A corresponds to an implementation of the Physical Media Specific Transmission Convergence (PMS-TC or TC) layer. The TC layer is a sublayer of physical layer that is used for preparing data to be transmitted across physical media. In an embodiment, transmitter 200 includes a memory 202, a first dynamic memory access memory (DMA) controller (DMA1) 208, a cyclical redundancy check (CRC) module 210, a scrambler 212, a Reed Solomon (RS) encoder 214, an interleaver 216, a second DMA controller (DMA2) 218, and a central processing unit (CPU) 220. Memory 202 includes an output buffer 204 and a transmit buffer 206. Memory 202 may be a single contiguous memory so that output buffer 204 and transmit buffer 206 are implemented as portions of memory 202. Alternatively, portions of memory 202 may be implemented separately. For example, output buffer 204 and transmit buffer 206 may be implemented as independent and self-contained memories.

DMA1 208 reads segments of output buffer 204 based on DMA descriptors generated by CPU 220. In an embodiment, a DMA descriptor specifies segments of a memory from which data is to be read and/or to which data is to be written. For example, to retrieve a codeword from output buffer 204, CPU 220 may generate a DMA descriptor that specifies one or more segments of output buffer 204 to be read by DMA1 208 so that the desired codeword is received. Each of the specified segments may contain a portion of the desired codeword. In a further embodiment, the specified segments that hold the codeword can be non-sequential, i.e., a specified segment may be separated from another specified segment by an unspecified segment. In an embodiment, a segment contains one or more bytes of information.

Alternatively, CPU 220 may directly access the contents of output buffer 204 without the use of DMA1 208. However, in such an embodiment, CPU 220 engages in byte-by-byte operations with output buffer 204. For example, CPU 2.20 may read one or more segments of output buffer 204 in a byte-by-bye manner. DMA1 208 allows CPU 220 to instead generate a DMA descriptor from which DMA1 208 can execute the necessary byte-by-byte operations. Thus, CPU 220 specifies a large scale operation (e.g., the reading of a codeword) through a DMA descriptor and then can perform other tasks while DMA1 208 handles the byte-by-byte operations associated with specified large scale operation. In alternate embodiments, DMA1 208 may receive a DMA descriptor from other devices. For example, DMA1 208 may receive a DMA descriptor from an input/output (I/O) device or a peripheral device (not shown).

DMA1 208 is coupled to CRC module 210. CRC module 210 calculates a CRC value for a codewords and inserts it into the codeword. In an embodiment, the calculated CRC can be used by a receiver to determine whether a received codeword includes an error. CRC module 210 can calculate CRC values for codewords according to one of a variety of methods known to those skilled in the art.

Scrambler 212 scrambles codewords received from CRC module 210. Scrambling codewords may improve signal performance when the codewords are sent to receiver. Scrambler 212 may be configured to scramble codewords according to one of many different types of scrambling methods known to those skilled in the art.

RS encoder 214 is encodes received codewords according to the RS encoding technique. Such an encoding operation allows for errors to be detected at a receiver. Furthermore, such an encoding operation also allows for some errors to be corrected at a receiver. As would be appreciated by those skilled in the relevant art(s) based on the description herein, RS encoder 214 may also be replaced with other types of encoders that similarly allow for error correction and/or error detection, without departing from the scope and the spirit of the present invention.

Interleaver 216 interleaves received codewords. For example, interleaver 216 may interleave received codewords according to a block or convolution technique. Interleaving codewords may enhance the performance of a DSL system. Interleaved codewords may be more resistant to certain types of noise, e.g., burst noise.

DMA2 218 receives codewords from interleaver 216 and writes the codewords to transmit buffer 206 based on DMA descriptors generated by CPU 220. After a codeword is written to transmit buffer 206, the codeword is retrieved by another portion of transmitter 200 (not shown) in which other operations (e.g., constellation encoding and/or modulation) are completed. Once these operations are complete, the codeword may be transmitted to a receiver.

1.2 DSL Receiver

FIG. 2B shows a block diagram of a portion of a receiver 250 according to an embodiment of the present invention. In an embodiment, receiver 250 is configured to receive codewords transmitted by transmitter 200 shown in FIG. 2A. In another embodiment, the portion of receiver 250 shown in FIG. 2B is an implementation of the TC layer.

Receiver 250 includes a memory 252, a first DMA controller (DMA1) 258, a de-interleaver 260, an RS decoder 262, a descrambler 264, a CRC module 266, a second DMA controller (DMA2) 268, and a CPU 270. Memory 252 includes an input buffer 254 and a receive buffer 256. Codewords are written to input buffer 254 after initial processing is completed. For example, codewords may be written to input buffer 254 after constellation decoding and demodulation operations are completed. DMA1 258 is configured to read codewords from input buffer 254 based on DMA descriptors generated by CPU 270.

De-interleaver 260 de-interleaves received codewords. In an embodiment, de-interleaver 260 performs the opposite operation of interleaver 216 of transmitter 200. For example, if interleaver 216 is configured to interleave codewords according to a block interleaving technique, then de-interleaver 260 may be configured to de-interleave codewords according to a de-interleaving technique that corresponds to block interleaving.

RS decoder 262 decodes RS-encoded codewords. For example, RS decoder 262 may be configured to perform the opposite operation of RS encoder 214 of transmitter 200. As would be apparent to those skilled in the relevant art(s) based on the description herein, RS decoder 262 may be replaced with other types of decoders to correspond with an encoding technique of a transmitter (e.g., transmitter 200).

Descrambler 264 descrambles received codewords. For example, descrambler 264 may perform the opposite operation of scrambler 212 of transmitter 200.

CRC module 266 receives descrambled codewords and performs a CRC check to determine if errors are present in the codewords. Additionally or alternatively, errors within a codeword may be also detected by RS decoder 262. Furthermore, as described above, RS decoder 262 may also be able to correct some errors present in a received codeword. In an embodiment, CRC modules 210 and 266 of transmitter 200 and receiver 250, respectively, may be removed if errors can be detected with a high enough degree of certainty. Alternatively, CRC modules 210 and 266 can be incorporated in other modules (e.g., RS encoder 214 and RS decoder 262, respectively).

DMA2 268 is configured to write the received codewords to receive buffer 256 based on DMA descriptors generated by CPU 270. Once a codeword is written to receive buffer 256, additional processing is performed and data contained in the received codewords are then provided to the end user.

2. PTM PROTOCOL

Different protocols may be used by a DSL system for communication. In accordance with an embodiment of the present invention, one data encapsulation protocol used by DSL modems communicating at the TC layer is the 64/65-Octet Packet Transfer Mode Protocol ("PTM Protocol" or "PTM"). PTM is used for nearly all VDSL2 modems (ITU recommendation G.993.2) and is also optional in ADSL2 models (ITU recommendation G.992.3). The 64/65-octet PTM-TC sublayer functional specifications of ITU-T Recommendation G.992.3 and IEEE Std. 802.3ah are both incorporated herein by reference in their entirety.

2.1 Codewords

In PTM, data is grouped in 65 byte codewords which are concatenated to each other, with no other data in between, to form a continuous data stream. The first byte of each codeword is called a "sync byte" and is used to convey information regarding the content of the remaining 64 bytes. The sync byte aids in synchronizing to the data stream, demarcating codeword boundaries, and identifying the context of the codeword.

FIG. 3 shows a table 300 of the codeword types in the PTM-TC layer of DSL. Data frames start and end in codewords whose sync byte is $F0_{16}$. Frame data 302 starts immediately after a start byte (value $50_{16}$), and frames end when a sync byte 304 (value $F0_{16}$) is followed immediately by a valid $C_k$ byte representing the number of bytes remaining in the frame. All the remaining bytes 306 in a codeword starting with a sync byte of $0F_{16}$ append to the frame that had been started in a previous codeword.

Each type 308 of PTM codeword in PTM will now be explained with reference to FIG. 3. "All data" 310 codewords are indicated by sync byte 0x0F and result in the entirety of the codeword being part of a data frame already in transit. "End of frame" 312 codewords are indicated by a sync byte of 0xF0 followed by $C_k$ (a byte count) and result in the next $C_k$ bytes terminating a frame already in transit. If another data frame is to be sent, the "start of frame while transmitting" codeword 314 is used, and another frame is started in the codeword after all the data from the previous frame is sent. The "all idle" codeword 316 is indicated by a sync byte of 0xF0, followed by zero bytes (shown as "Z" in FIG. 3). The "all idle" codeword 316 is sent when the transmitter has no data to transmit. The "start of frame while idle" codeword 318 is indicated by a sync byte of 0xF0 followed by some zero bytes and a start byte "S" (0x50). The "start of frame while idle" codeword 318 is used when data arrives before the "all idle" codeword is complete. In this case, the series of Zs is terminated, and a special start byte (0x50) marks the beginning of a new frame. The "all idle out of sync" codeword 320 is indicated by a sync byte of 0xF0 followed by a special "Y" byte (0xD1) and followed by zero bytes. The "all idle out of sync" codeword 320 tells the far-end transmitter that the near-end receiver has not synchronized to the data stream. In other words, the receiver has not yet determined where in the received stream of bytes the codeword boundaries start.

2.2 all Idle Out-of-Sync

The "All Idle Out-Of-Sync" codeword ("AIOOS"), which has a sync byte of $F0_{16}$ followed by a "Y" byte of $D1_{16}$ and 63 zeroes, is sent when the near-end receiver has not definitively synchronized so as to determine codeword boundaries from data received from the far-end. For example, this situation often occurs when the connection is initially established, and insufficient codewords have appeared before synchronization. The AIOOS codeword tells the far-end transmitter that the near-end receiver has not synchronized to the data stream. In such a case, it makes no sense for the far-end transmitter to continue transmitting to a receiver that cannot properly process any received information, because any data that is sent to the receiver will have to be retransmitted once the near-end receiver has finished synchronizing the data stream. Detecting missing data, and responding accordingly, at the application layer takes extra time and causes latency, which can negatively impact the user experience.

In this instance, the far-end transmitter should send idle codewords with no new frame starting. In fact, the IEEE 802.3ah standard requires the far-end transmitter to send All Idle (AI) when its co-located receiver receives an AIOOS codeword, as described the IEEE 802.3ah standard clause 61.3.3.1 ("TC encapsulation and encoding"). The AI codeword has a synch byte of $F0_{16}$ followed by 64 zeroes and is sent when there is no application data to send or when the near-end modem receives an AIOOS codeword. The intent of the AIOOS codeword is to halt the far-end transmitter's data traffic, causing it to send AI codewords, until the near-end receiver synchronizes to this All-Idle codeword stream. Thus, AI codewords force the near-end modem to refrain from sending useful tiara until the connection is synchronized.

In accordance with embodiments of the present invention, the near-end transmitter is configured to generate the AIOOS codeword when the co-located receiver's data buffer is in danger of overflowing (after the 64/64 decapsulation), instead of transmitting an AIOOS codeword when the co-located near-end receiver is truly out of sync. By utilizing methods and systems according to embodiments of the present invention, a receiver can instruct a transmitter to pause sending data until the receiver's buffers have cleared enough of their capacity such that they are able to receive more data. Generating the AIOOS codeword when the receiver's buffer is in danger of overflowing, rather than when the buffer is already overflowing, advantageously saves time because the receiver does not have to detect as many (or in some cases, any)

dropped frames that are sent by the transmitter before it recognizes the AIOOS codeword being sent. Embodiments of the present invention also advantageously improve latency and, thus, the user experience.

2.3 Transmitter/Receiver Synchronization

Figure 4:
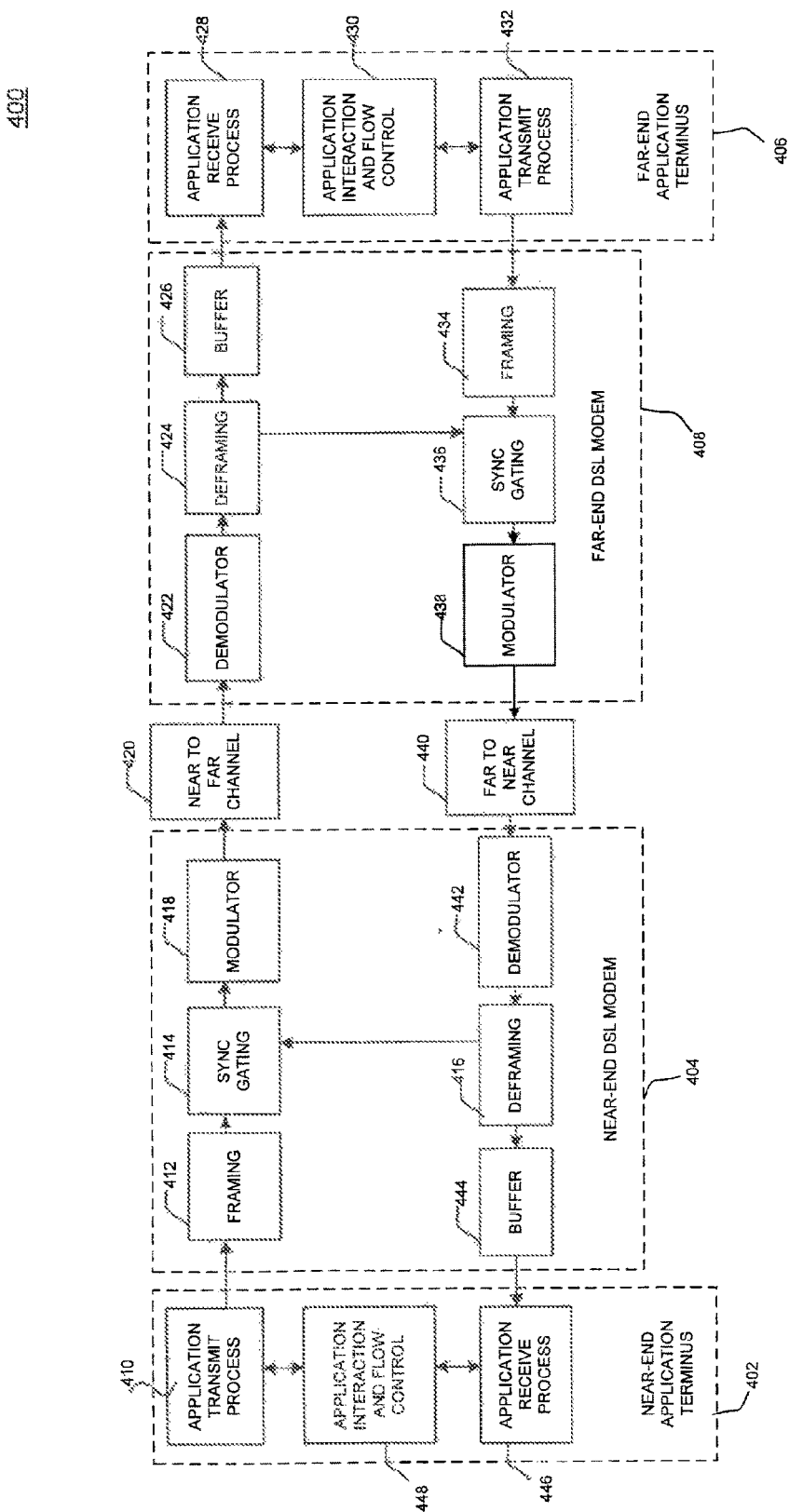
FIG. 4 is a diagram 400 illustrating transmission of an application in a DSL system according to an embodiment of the present invention.

An example of transmission of an application in a DSL system 400 will now be described with reference to FIG. 4. FIG. 4 depicts the flow of data between near-end application terminus 402, coupled to near-end DSL modem 404, and far-end application terminus 406, coupled to far-end DSL modem 408. The data being transmitted to the far-end could be web data, video on demand, file transfer, or any other application that uses a DSL link. For example, if an application is being transmitted from a DSL service provider to a customer, the near-end DSL modem 404 could be represented as one of the central office termination units 122 in DSLAM 120, and the far-end DSL modem could be represented as termination unit 114 of customer 102.

Both near-end DSL modem 404 and far-end DSL modem 408 take application transmit data frames as PTM codewords at the TC layer. At the near end, application transmit process 410 sends data to near-end DSL modem 404 for transmission over a channel (i.e., twisted pair) to the far end. Framer 412 of the near-end DSL modem 404 takes frames and breaks them up into code words. Sync gating module 414 receives synchronization information from deframer 416. If deframer 416 receives an AIOOS signal from the far-end, then deframer 416 instructs sync gating module 414 to transmit idles to the far end. Modulator 418 modulates the "data" for transmission over near-to-far channel 420 to far-end DSL modem 408, where the term "data" could be user data, AIOOS signals, or idle signal, depending on the link status as discussed herein.

Far-end DSL modem 408 includes demodulator 422, which demodulates the data and passes it to deframer 424, which determines whether the far-end is synchronized to the near end. The data from deframer 424 is then passed to buffer 426. Buffer 426 has a limited capacity and can overflow if too much data is received before the data can be processed and sent to application receive process 428 of the far-end application terminus 406. If buffer 426 overflows, frames are dropped, and application interaction and flow control module 430 detects that frames are being dropped. This detection takes time and causes latency, which negatively impacts the user experience.

If application and interaction flow control module 430 detects one or more dropped frames, it sends a retransmission request to the near-end through application transmit process 432, where the retransmission request is multiplexed with data. The data to be transmitted to the near end is framed at framer 434. The resulting data is modulated by modulator 438, sent to near-end DSL modem 404 over far-to-near channel 440, and demodulated by demodulator 442.

Embodiments of the present invention provide increased performance by detecting when buffer 426 is near capacity, and then having the far-end to transmit an AIOOS to the near-end before buffer 426 overflows and frames are dropped. For example, when buffer 426 reaches a predetermined threshold or range (for example, when buffer 426 is ¾ full), embodiments of the present invention provide systems and methods to instruct sync gating module 436 to transmit an AIOOS signal to near-end DSL modem 404, which detects the AIOOS signal at deframer 416 and instructs sync gating module 414 to transmit idles until synchronization is restored.

While this example shows data being transmitted from near-end application terminus 402 to far-end application terminus 406, it should be understood that embodiments of the present invention may be implemented at either the far-end or the near end. For example, if buffer 444 at the near-end overflows or is approaching overflow due to receiving too much data from the far-end before it can be properly processed, application interaction and flow control module 448 detects this and sends a retransmission request to the far-end by instructing sync gating module 414 to transmit an AIOOS signal to the far-end. Deframer 424 receives the MOOS signal and instructs sync gating module 436 to transmit idles until the near-end is synchronized to the far-end.

FIG. 5 depicts a more detailed diagram 500 of the flow of data between the near-end application terminus 402 and near-end DSL modem 404. In FIG. 5, synchronization detection and verification module 502 detects a received AIOOS signal from the far-end and instructs the gating select module 504 of multiplexer 506 to transmit all idles to the far end. Synchronization detection and verification module 502 also verifies that sync bytes have been received. If sync bytes are not received, synchronization detection and verification module 502 determines that data has been corrupted, and AIOOS code word generator 516 generates AIOOS codewords, which are multiplexed by multiplexer 506, modulated by modulator 418, and transmitted to the far-end.

If the transmission of frames by the far end causes buffer 444 to overflow, some frames may be dropped 510. For example, this scenario may occur when the application is routing Ethernet frames using complicated rules that are time-consuming to implement. Frames may also be dropped if the checksum does not match, which indicates that data has been corrupted.

Application interaction and flow control module 448 is shown with two paths—one path for normal application interaction 511 and one path for dropped frame detection 512. Normal application interaction module 511 handles normal application interaction with received frames, such as supplying requested web pages, and dropped frame detection module 512 detects dropped frame(s). In this instance, dropped frame detection module 512 detects the dropped frame(s) 510 and initiates a retransmission request 514 to application transmit process 410. Application transmit process 410 sends application messages to the far-end to take corrective action (often a retransmission of data) for the missing data. The actual messages and corrective action are application-specific and beyond the scope of this invention; however such corrective methods invariably involve a great deal of latency and cause a degradation in the user experience.

As discussed above, detection of dropped frames at the application layer causes unnecessary delay. Dropped frame detection module 512 and retransmission request module 514 operate at a higher layer above the DSL physical layer, and passing the retransmission request from near-end application-layer through the physical link to the far-end application layer involves an undesirable amount of latency, which adversely impacts the quality of the application. Accordingly, embodiments of the present, invention provide systems and methods to instruct sync gating module 414 to generate an AIOOS codeword when buffer 444 is near full capacity, rather than when buffer 444 is overflowing, to reduce latency and improve the user experience.

2.4 Waterlines

Embodiments of the present invention incorporate one or more "waterline" levels used to control when to send AIOOS. In an embodiment, these waterline levels refer to the fullness of the near-end receiver's buffer. For example, in an embodiment, a High-Waterline (HWL) level measures a buffer quantity close to the capacity of the near-end receiver's buffer. When the amount of the received data exceeds the HWL, the near-end transmitter sends AIOOS at the completion of the current fragment and continues transmitting AIOOS codewords until the amount of received data drops below a Low-Waterline (LWL) level.

In an embodiment, HWL and LWL are programmable and are configured (for example, either on power-up or on-the-fly) as percentages of the receiver buffer capacity, depending on the data rate and the transmission latency of the link. This programmability is useful to handle real-world situations where there is some delay in sending and receiving the AIOOS codeword. For example, if the latency of the link is long, and if there is interleaving in Reed-Solomon Forward Error Correction (used in DSL systems to spread out burst errors into isolated errors that are correctable by Reed Solomon codes) on the physical layer link between the near-end and far-end TC sublayer process, then the AIOOS codeword will take a long time to reach the destination, by which time the bottleneck at the near-end receiver may have already cleared. In an embodiment, the high-waterline is configured to be low enough to account for: (1) the anticipated traffic that will arrive in the interval between the moment the high-waterline is exceeded at the near-end modem; (2) the time until the AIOOS is acted upon by the far-end modem; and (3) the time until the AI codewords (co-opting the application traffic) appear at the near-end buffer. Such a configuration advantageously prevents (or lessens the amount of) dropped frames, which reduces latency and improves application quality and the user experience.

In an embodiment, the HWL value is lowered if the near-end receiver determines that frames are being dropped. For example, the HWL value may be incrementally lowered until the near-end receiver determines that frames are no longer being dropped. Additionally, in some embodiments, the HWL may be incrementally increased as traffic increases, and the near-end determines that the HWL may safely be increased without frames being dropped by the near-end receiver. In this way, the near-end receiver may automatically configure the HWL to compensate for changing traffic conditions at the near-end, leading to an increase in efficiency without compromising latency.

A diagram 600 depicting an embodiment of the present invention incorporating a high waterline and low waterline will now be explained with reference to FIG. 6. In FIG. 6, buffer 444 has been modified to include read pointer 602 and write pointer 604, and sync gating module 414 has been modified into sync and flow-control gating module 606. Read pointer 602 and write pointer 604 detect how close buffer 444 is to being full. For example, read pointer 602 may indicate how much data is being read from buffer 444, and write pointer 604 may indicate how much data is being written to buffer 444. In an embodiment, the "fullness" of buffer 444 may be calculated by buffer fullness calculation module 608 as the value of write pointer 602 minus the value of read pointer 604. If the value of read pointer 602 is equal to the value of write pointer 604, buffer 444 is empty. As data is written to buffer 444, the value of the write minus read "fullness calculation" increases.

Sync and flow control gating module 606 includes buffer fullness calculation module 608, which incorporates low waterline (LWL) 610 and high waterline (HWL) 612. Buffer fullness calculation module 608 detects if buffer 444 is above HWL 612 or below LWL 610. Buffer fullness calculation module 608 compares the "fullness" of buffer 444 to LWL 610 and HWL 612. LWL 610 and HWL 612 may be fixed or programmable. For example, in an embodiment, HWL 612 may be configured as ¾ of the capacity of buffer 444, and LWL 610 may be configured as ¼ of the capacity of buffer 444.

In an embodiment, if the "fullness" of buffer 444 exceeds HWL 612, buffer fullness detection module 614 instructs multiplexer 506 to generate an AIOOS codeword. In another embodiment, the AIOOS codeword may be generated if the "fullness" of buffer 444 exceeds or is equal to HWL 612. AIOOS codeword generator 516 generates the AIOOS codeword, which is multiplexed by multiplexer 506, modulated by modulator 418, and passed to the far end. In an embodiment, AIOOS codewords are transmitted until LWL 610 is crossed (i.e., until buffer fullness calculation module 608 determines that the "fullness" of buffer 444 is less than LWL 610). In an embodiment, once buffer tallness calculation module 608 determines that LWL 610 has been crossed (i.e., the "fullness" of buffer 444 is less than LWL 610), buffer fullness detection module 614 instructs multiplexer 506 to stop transmitting AIOOS codewords and to resume transmitting data to the far end, in another embodiment, buffer fullness detection module 614 instructs multiplexer 506 to stop transmitting AIOOS codewords and to resume transmitting data to the far end once buffer fullness calculation module 608 determines that the "fullness" of buffer 444 is equal to or less than LWL 610.

Further, while FIG. 6 shows an embodiment with two waterlines (LWL 610 and HWL 612), it should be understood that embodiments of the present invention incorporating one waterline or more than two waterlines are also contemplated. For example, an embodiment of the present invention may incorporate only a HWL without incorporating a LWL. Additionally, an embodiment of the present invention may incorporate a third waterline (or additional waterlines) between HWL 612 and LWL 610. For example, such additional waterlines may be used to instruct multiplexer 506 to take certain actions (e.g., transmit predefined codewords) after each waterline is crossed.

Embodiments of the present invention may incorporate additional PTM codewords to send information regarding the "fullness" of buffer 444 to the far end. Such additional codewords may be used to inform the Car end about the current "fullness" of buffer 444, and the far end may be configured to transfer data at a slower or faster rate depending on the information received from the near-end regarding the "fullness" of buffer 444. For example, a codeword may be used to transmit the current buffer fullness calculation value to the far-end in a frame. Additional PTM codewords may also be provided to ensure that transmit buffers do nor get inadvertently dumped. These new codewords may be negotiated, for example, through a handshake processes, such as ITU recommendation G.994.

As discussed above, it should be understood that embodiments of the present invention may be implemented at both a transmitter and a receiver. Further, while embodiments of the present invention are discussed above with reference to a DSL system, it should be understood that embodiments of the present invention are envisioned in any communications system containing a buffer used to receive data.

3. METHODS

A method 700 according to an embodiment of the present invention will now be explained with reference to FIG. 7. In step 702, data from a transmitter device is received using a buffer. In step 704, it is determined whether a current capacity of the buffer exceeds a value of a high waterline that is configured as an amount lower than a maximum capacity of the buffer. In step 706, a message is sent to the transmitter instructing the transmitter to stop sending the data in response to determining that the current capacity of the buffer exceeds the value of the high waterline.

Steps 708 and 710 are optional. In step 708, it is determined whether the current capacity of the buffer is less than a second value of a low waterline that is configured as a second amount greater than a minimum capacity of the buffer. In step 710, a second message is sent to the transmitter instructing the transmitter to resume sending the data in response to determining that the current capacity of the buffer is less than the second value of the low waterline.

As discussed above, method 700 may be implemented in any communications system containing a buffer used to receive data. In an embodiment, the transmitter device of method 700 is a DSL modem, and the message includes a PTM AIOOS codeword. Additional methods according to the embodiments of the invention described above are also contemplated.

FIG. 8 is a diagram 800 showing a timeline of the fullness of a buffer, as AIOOS is set and reset, in accordance with an embodiment of the present invention. The top portion of FIG. 8 shows a diagram of buffer fullness 802 (between 0% and 100%), and the bottom portion of FIG. 8 shows a timeline 804 of an AIOOS signal as it is set and reset as buffer waterline levels are reached. As shown in FIG. 8, the AIOOS signal is not transmitted when the buffer has not yet received any data 806. When the buffer fullness reaches a high waterline 808, the AIOOS signal is set 810 to prevent the buffer from overflowing. (i.e. AIOOS signals are sent from near-end to far-end, instead of data) As shown in FIG. 8, some data 812 will still be received by the buffer after AIOOS is set, due to the time required for the far end to receive the AIOOS signals and begin transmitting idles. However, the high waterline is ideally set such that the far end has enough time to receive and process the AIOOS signal before the buffer overflows.

After the far end receives the AIOOS signals, the buffer will begin to empty, until the low waterline is reached 814. At this time, AIOOS is reset 816 and the near end stops sending the AIOOS signals. As shown in FIG. 8, the buffer will continue to empty after AIOOS is reset 818, due to the time required for the far end to determine that AIOOS is no longer being sent. However, the low waterline is ideally set such that the far end has enough time to determine that AIOOS is no longer being sent before the buffer is fully empty.

After the far end determines that AIOOS is no longer being sent, the far end will stop transmitting idles and will start to transmit data frames again to the near end. Eventually, the high waterline 820 of the buffer may be reached again, at which time AIOOS will be set again 822. When the low waterline of the buffer is reached again 824, AIOOS will be reset once again 826.

The representative signal processing functions described herein (code word generation, sync detection, framing, deframing, etc.) can be implemented in hardware, software, or some combination thereof. For instance, the signal processing functions can be implemented using computer processors, computer logic, application specific circuits (ASIC), digital signal processors, etc., as will be understood by those skilled in the arts based on the discussion given herein. Accordingly, any processor that performs the signal processing functions described herein is within the scope and spirit of the present invention.

Further, the signal processing functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present invention.

4. CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A first modem, comprising:
   a buffer including:
      a first pointer, and
      a second pointer; and
   a synchronization module configured to:
      determine, based on the first pointer and the second pointer, a fullness of the buffer;
      determine whether the fullness of the buffer exceeds a waterline, wherein the waterline is configured based on an expected time required for a second modem to respond to a codeword generated by the first modem, and
      in response to determining that the fullness of the buffer exceeds the waterline, initiate a transmission of the codeword.

2. The first modem of claim 1, wherein the first modem is a Digital Subscriber Line (DSL) modem.

3. The first modem of claim 1, wherein the first pointer is a read pointer, and wherein the second pointer is a write pointer.

4. The first modem of claim 1, wherein the synchronization module is configured to determine the fullness of the buffer by calculating a difference between a first value of the first pointer and a second value of the second pointer.

5. The first modem of claim 1, wherein the codeword is an idle codeword.

6. The first modem of claim 1, wherein the codeword is an All Idle Out Of Sync (AIOOS) codeword.

7. The first modem of claim 1, wherein the first modem is configured to adjust the waterline based on traffic at the first modem.

8. The first modem of claim 1, wherein the first modem is configured to lower the waterline in response to determining that a frame was dropped or that a frame will likely be dropped.

9. A method, comprising:
   determining, using a processing device in a first modem, a fullness of a buffer based on a first pointer of the buffer and a second pointer of the buffer;
   determining, using the processing device, whether the fullness of the buffer exceeds a waterline, wherein the waterline is configured based on an expected time required for a second modem to respond to a codeword generated by the first modem; and in response to determining that the fullness of the buffer exceeds the waterline, initiating a transmission of the codeword.

10. The method of claim 9, wherein the first pointer is a read pointer, and wherein the second pointer is a write pointer.

11. The method of claim 9, further comprising:
calculating a difference between a first value of the first pointer and a second value of the second pointer.

12. The method of claim 9, wherein the codeword is an idle codeword.

13. The method of claim 9, wherein the codeword is an All Idle Out Of Sync (AIOOS) codeword.

14. The method of claim 9, further comprising:
adjusting the waterline based on traffic at the first modem.

15. The method of claim 9, further comprising:
lowering the waterline in response to determining that a frame was dropped or that a frame will likely be dropped.

16. A synchronization module for a first modem, the synchronization module comprising:
a codeword generator configured to generate a codeword; and
a buffer fullness detection module configured to:
receive information indicating a fullness of a buffer,
determine whether the fullness of the buffer exceeds a waterline, wherein the waterline is configured based on an expected time required for a second modem to respond to the codeword, and
in response to determining that the fullness of the buffer exceeds the waterline, initiate a transmission of the codeword.

17. The synchronization module of claim 16, wherein the buffer fullness detection module is configured to determine the fullness of the buffer based on a difference between a first value of a first pointer of the buffer and a second value of a second pointer of the buffer.

18. The synchronization module of claim 16, wherein the codeword is an idle codeword.

19. The synchronization module of claim 16, wherein the codeword is an All Idle Out Of Sync (AIOOS) codeword.

20. The synchronization module of claim 16, wherein the buffer fullness detection module is further configured to adjust the waterline in response to traffic at the first modem.

* * * * *